Nov. 25, 1941.  J. FLETCHER  2,263,946
BROILER
Filed Aug. 3, 1940
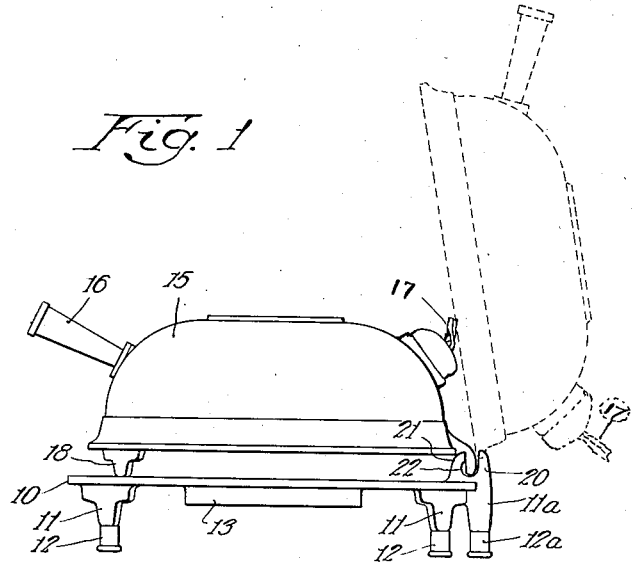
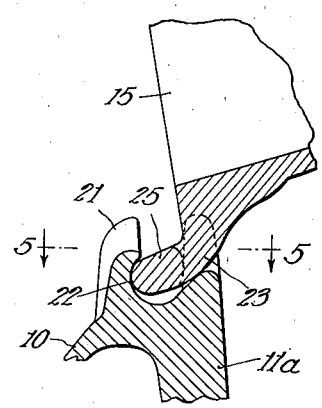
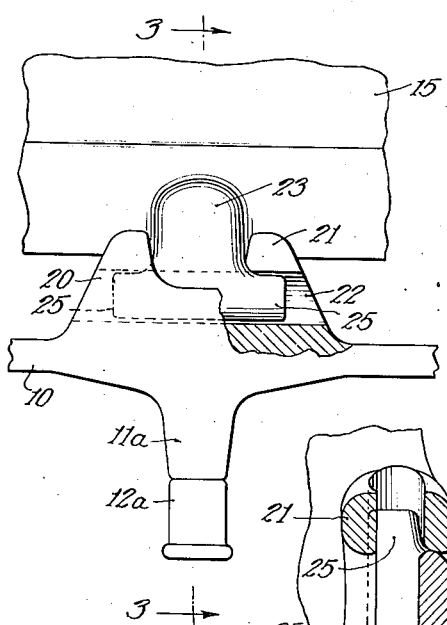
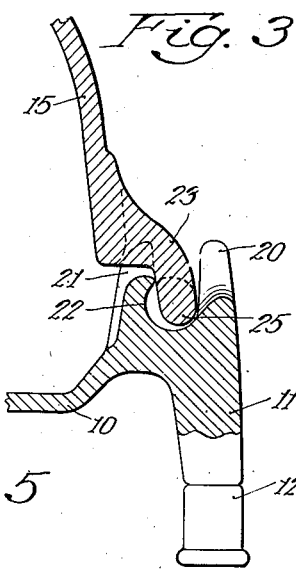
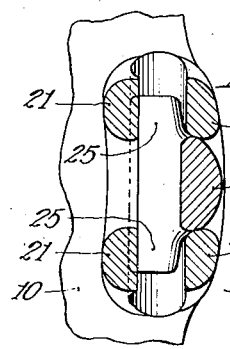
Inventor
John Fletcher Patented Nov. 25, 1941

2,263,946

UNITED STATES PATENT OFFICE 2,263,946

BROILER

John Fletcher, Chicago, Ill., assignor to H D Electric Co., Chicago, Ill., a corporation of Illinois Application August 3, 1940, Serial No. 350,755

3 Claims. (Cl. 53—5)

The present invention relates to broilers and more particularly to electric broilers adapted for dining table use. A broiler of this general character comprises a base plate which receives the food to be cooked and a cover which substantially overlies said base plate. The cover is in the form of a hollow shell which on the inside is provided with electric heating elements. The base plate is supported by insulating legs to permit use of the broiler on the dining table without danger of damage to the table.

Prior devices of this general character present the problem of what to do with the hot cover after the broiling has been completed. Ordinarily the cover is removable from the base plate, but in such a heated condition, the cover should better not be handled or moved from place to place. In addition to the danger to the operator, the table or place to which the cover is removed is likely to be damaged by the intense heat. The problem is not wholly solved by providing an ordinary hinge connection between the base plate and cover, as there are many instances, such as cleaning and storing, when it is desirable to remove the cover from the base plate. Such removal, of course, would not be possible where an ordinary hinge is utilized.

It is the principal purpose of the present invention to provide a broiler of the character described wherein the cover may be pivoted to open position and yet be held firmly by its own weight to the base plate. The nature of the connection between the base plate and cover is such that the cover may be maintained in open position on the base plate while the operator cuts and handles the meat after cooking. Then the cover may be closed to prevent cooling of the meat remaining on the base plate. It is the further purpose of the present invention to provide a connection which permits the cover readily to be removed from the base plate. Such provision is necessary for convenience in cleaning the device after use. As will be understood, the cover containing the heating elements should not be submerged in water, but the application of water and cleansers is usually necessary to thoroughly clean the base plate. Therefore the cover should be removable.

The present invention provides a hinge connection between the cover and base plate which permits the cover to be removed as it is pivoted towards its open limit of movement. As such open limit is approached, however, members in the connection associate to prevent disengagement from that point on to the open limit. In fact, when the open limit is reached, the whole unit may be transported by means of a handle extending from the cover. At any point up until this open limit is approached, the cover readily is removable from the base plate. It will be noted further that when the cover is in fully opened position, the engaging parts of the connection cooperate to impart lateral stability to the cover, that is, the cover, although supported at only the one point, cannot rock from side to side and commence to work loose from its open position.

Other features and advantages of the present invention will appear more fully as the description proceeds, reference being had to the accompanying drawing, wherein a preferred form of the invention is shown. It is to be understood, however, that the drawing and description are illustrative only, and are not to be taken as limiting the invention except insofar as it is limited by the claims.

In the drawing—

Fig. 1 is a view in end elevation of a broiler embodying the present invention;

Fig. 2 is a fragmentary view substantially on the line 2—2 of Fig. 1 having a portion cut away to more clearly show my novel hinge construction;

Fig. 3 is a cross sectional view on the line 3—3 of Fig. 2;

Fig. 4 is a fragmentary cross sectional view similar to Fig. 3 but showing the hinge construction when the cover is in open position; and Fig. 5 is a cross sectional view on the line 5—5 of Fig. 4.

Referring now in detail to the drawing, and in particular to Fig. 1 thereof, the present invention comprises a broiler having a base plate 10 supported on legs 11. The legs 11 may be tipped with portions 12 of heat insulating material. Suitable insulating material such as Bakelite or the like may be used for the portions 12. At each end of the base plate 10 is a handle 13 which may be of the same insulating material as the leg tips 12.

A cover 15 having the general configuration of a hollow shell substantially covers the upper surface of the base plate 10. A handle 16 of heat insulting material extends from the cover 15 to provide means for opening, closing and removing said cover with respect to said base plate. A connector plug on the cover receives electric cord 17 in the central opening. The electric cord 17 is connected to heating elements (not shown) mounted interiorly of the cover 15. Lugs 18 project downwardly from the rim of the cover 15 and rest on the base plate 10 near its periphery. The lugs 18 cooperate with elements hereinafter described to space the cover 15 from the base plate 10.

Having thus described the base plate and cover members of my broiler, I now pass to a detailed description of the hinge by means of which the two members are removably joined together. The said hinge may be located centrally of the broiler and on the side thereof opposite the handle 16. Spaced lugs 20 extend upwardly from the said side of the base plate 10. Inwardly of the lugs 20 are spaced lugs 21 which also extend upwardly from the base plate 10. The lugs 20 and 21 preferably are cast integral with the base plate 10. The lower portion of the lugs 21 on the side thereof adjacent the lugs 20 is cut away to provide an arcuate surface as shown at 22. As will be understood, the upstanding lugs 20 and 21 cooperate to provide a seat to receive the hereinafter described members extending from the cover 15.

A hook portion 23, preferably cast integral with the cover 15, extends outwardly and downwardly from the edge of the cover 15 directly above and between the upstanding lugs 21. The free end of the hook portion 23 has lateral extensions 25 which are received between the oppositely disposed lugs 20 and 21. The lower sides of the lateral extensions 25 are curved to present a cam surface which cooperates with the undercut arcuate surfaces 22 of the lugs 21 as hereinafter described.

An auxiliary leg 11a and insulated tip 12a may be provided on the base plate directly below the hinge to particularly carry the increased weight at that point when the cover is in open position.

Referring now to Figs. 2 and 3, the cover 15 of the broiler is shown in closed position. This is, of course, one of the limits of movement of said cover with respect to the base plate. As can be seen, the hook portion 23 passes between the lugs 21 and downwardly into the seat formed by the respective lugs. The lateral extensions 25 extend between opposite lugs and rest on the bottom of said seat to cooperate with the previously mentioned lugs 18 to support the cover 15 in spaced relationship with the base plate 10. The relative position of the hinge parts when the cover is at its open limit of movement is shown in Fig. 4. As will be noted, the lower part of the hook portion 23 rests on the base plate between the lugs 20. In open position the center of gravity of the cover 15 falls outside of the hinge, thereby tending to cause the cover to fall over backwards. This tendency is opposed by engagement of the cam surface of the extensions 25 with the arcuate surfaces 22 of the lugs 21. The cover is thereby maintained in a substantially vertical position by its own weight. This is the open limit of movement of said cover with respect to the base plate. As will be understood, lateral tipping of the cover when in open position is opposed by the engagement of the lateral extensions 25 and the arcuate surfaces 22 of the lugs 21.

When the cover is in open position as described, the whole broiler may be lifted by means of the handle 16. In other words, the interlocking portions comprising the hinge are not disengageable when the cover is at its open limit of movement. To facilitate handling and cleaning of the broiler it is, of course, desirable to remove the cover from the base plate. The hinge as described, of course permits such removal at any pivoted position of the cover up until the open limit of movement is approached. The ordinary method of removing the cover is to pivot it upwardly and at some time before the open limit is approached, to lift the cover away from the base plate, thereby raising the hook portion 23 out of the seat formed by the upstanding lugs 20 and 21.

From the foregoing description, it is believed that the construction and use of the broiler embodying the present invention will be readily apparent to those skilled in this art. Having thus described my invention, what I claim as new and desire to secure by Letters Patent is:

1. A broiler of the character described including a base plate and a cover, outer and inner spaced portions extending upwardly from said base plate, a cooperating portion extending from said cover and engaging said spaced portions whereby to provide a pivot for said cover, said cooperating portion including a cam surface which engages said spaced portions to limit movement of said cover to a substantially vertical position, said portions being disengageable except when said cover closely approaches and arrives at its open limit of movement.

2. A broiler of the character described including a base plate and overlying cover, and interlocking means comprising outer and inner spaced portions extending upwardly from said base plate and providing a seat, a hook portion projecting from said cover and engaging said seat, lateral projections extending from the free end of said hook portion and between said outer and inner spaced portions, the pivotal movement of said cover being limited by association of said hook portion and lateral projections with said outer and inner spaced portions, said interlocking means being disengageable except when said cover closely approaches and arrives at its open limit of movement as determined by said association.

3. A broiler of the character described including a base plate and overlying cover, and interlocking means comprising outer and inner spaced lugs extending upwardly from a side of said base plate and providing a seat, a hook portion extending outwardly and downwardly from said cover and engaging said seat, lateral projections extending from said hook portion and presenting a cam surface, said inner spaced lugs having a portion thereof cut away to receive said lateral projections and to present an arcuate surface to said cam surface, the pivotal movement of said cover being limited by association of said hook portion and lateral projections with said outer and inner spaced portions, said interlocking means being disengageable until said point of association is reached as the cover is pivoted toward open position.

JOHN FLETCHER.